UNITED STATES PATENT OFFICE.

HENRY R. ENGLISH, OF JACKSON, MISSOURI.

PLASTER COMPOUND.

SPECIFICATION forming part of Letters Patent No. 486,329, dated November 15, 1892.

Application filed January 22, 1892. Serial No. 418,950. (No specimens.)

*To all whom it may concern:*

Be it known that I, HENRY R. ENGLISH, of Jackson, in the county of Cape Girardeau and State of Missouri, have invented a new and Improved Plaster Compound, of which the following is a full, clear, and exact description.

This invention consists in a new and useful composition of matter to be used as an inside covering for walls and other surfaces; also, as an artificial stone or exterior coating or covering.

The mineral clays known as "kaolin," which carry a high percentage of alumina and silica and are highly refractory, are the basis of my improved compound. To produce the compound, I mix the kaolin with silicate of soda or its equivalent and with commercial glue, substantially as hereinafter specified, the kaolin being used either in a crude or calcined state, but in the latter state when the compound is required to make artificial stone or to be used as a plastic composition on outdoor surfaces. It is to be understood that when the calcined kaolin is used it is calcined before it is mixed with the silicate of soda and glue.

The following is a convenient and economical way of preparing the improved plaster, namely: to twenty parts of kaolin add one part crystallized silicate of soda, three parts sand and one part commercial glue. These substances should all be ground together, and when required to be used sufficient water is added to bring the mass to the required consistency of plaster. Such plaster, which is free from lime and hair, is much more dense than plaster made from lime, also stronger and more durable, as well as being fire and water resisting and germ-proof. I do not confine myself, however, to the exact proportions of ingredients above stated.

The kaolin, which is the body of the compound, contains a large per cent. of alumina and silica and is very plastic and dense, and by its use I am enabled to produce a much more dense and compact body than by any other clay. By its use, also, less glue and silicate of soda are required. The silicate of soda when water is added combines the particles of the several ingredients and makes a compact body; but it has a tendency to set too rapidly, and to arrest or retard the setting of the compound the glue is added, which not only has the property of retarding the setting of the compound, so that a large quantity of the compound may be prepared before the chemical action takes place, but it also renders the compound more adhesive.

Crystallized silicate of soda, commercial glue, and kaolin are, as stated, the chief and may be the only ingredients used to make a strong and enduring inside wall covering; also, an exterior coating or covering. Should the crystallized soda be too expensive at any time, then the following ingredients may be used instead of the crystallized silicate of soda, viz: a mixture composed of twenty parts of sharp white sand, sixty parts of Glauber salts, twenty parts of charcoal, and twenty parts of infusorial earth. These substances, together with the kaolin, are thoroughly pulverized and mixed together and moistened with water, after which they may be rolled or formed into balls or bricks and thoroughly dried, and subsequently be pulverized again and put up in packages for use. When required to use the same, sufficient water is added to reduce the whole to a proper consistency. Of course the proportion of the ingredients in this last-named modification may also be more or less changed.

Having thus described my invention, what I claim as new, and desire to secure by Letters Patent, is—

The herein-described composition of matter, consisting of kaolin, silicate of soda, glue, and sand, combined in about the proportions set forth.

HENRY R. ENGLISH.

Witnesses:
 MARCUS H. ROBB,
 DAVID B. SEIBERT.